(12) United States Patent
Scoda

(10) Patent No.: US 10,983,898 B2
(45) Date of Patent: Apr. 20, 2021

(54) METHODS FOR IMPROVED WEB APPLICATION TESTING USING REMOTE HEADLESS BROWSERS AND DEVICES THEREOF

(71) Applicant: Usablenet Inc., New York, NY (US)

(72) Inventor: Enrico Scoda, Martignacco (IT)

(73) Assignee: USABLENET, INC., New York, NY (US)

( * ) Notice: Subject to any disclaimer, the term of this patent is extended or adjusted under 35 U.S.C. 154(b) by 98 days.

(21) Appl. No.: 16/369,754

(22) Filed: Mar. 29, 2019

(65) Prior Publication Data
US 2020/0310945 A1    Oct. 1, 2020

(51) Int. Cl.
| | | |
|---|---|---|
| G06F 11/00 | (2006.01) | |
| G06F 11/36 | (2006.01) | |
| H04L 29/08 | (2006.01) | |
| G06F 3/0484 | (2013.01) | |

(52) U.S. Cl.
CPC ........ *G06F 11/3664* (2013.01); *G06F 3/0484* (2013.01); *G06F 11/3604* (2013.01); *G06F 11/3676* (2013.01); *G06F 11/3688* (2013.01); *H04L 67/02* (2013.01)

(58) Field of Classification Search
CPC ............. G06F 11/3688; G06F 11/3604; G06F 11/3668; G06F 11/3676; G06F 11/3684
See application file for complete search history.

(56) References Cited

U.S. PATENT DOCUMENTS

| | | | | |
|---|---|---|---|---|
| 10,747,655 | B2* | 8/2020 | Myers | ................. G06F 11/3696 |
| 2015/0363304 | A1* | 12/2015 | Nagamalla | .......... G06F 11/3648 |
| | | | | 702/123 |
| 2020/0133829 | A1* | 4/2020 | Zazo | ................... G06F 11/3457 |

* cited by examiner

*Primary Examiner* — Charles Ehne
(74) *Attorney, Agent, or Firm* — Troutman Pepper Hamilton Sanders LLP (Rochester)

(57) ABSTRACT

Methods, non-transitory computer readable media, and dashboard servers are disclosed that initiate a test of a web application on a runner server in response to a command. A test action associated with the test includes a user input trigger and a hint. A user input request, generated when the user input trigger is encountered during execution of the test with a headless browser, is received from the runner server. The user input request includes a session identifier and the hint. Input data is obtained from a user device via an input field that is output along with the hint to an input panel provided to the user device. The input panel is associated with the session identifier. The input data is then sent to the runner server in response to the user input request.

21 Claims, 14 Drawing Sheets

US 10,983,898 B2

METHODS FOR IMPROVED WEB APPLICATION TESTING USING REMOTE HEADLESS BROWSERS AND DEVICES THEREOF

FIELD

This technology generally relates to web application testing and, more particularly, to methods and devices for improved testing, using remote headless browsers, of web applications requiring user input.

BACKGROUND

Headless browsers are web browsers that can load a web page without using a graphical user interface (GUI). Headless browsers are often used for web site or web application testing purposes because their activity can be easily automated using application programming interface (API) called drivers. Headless browsers can be particularly useful when deployed remotely (e.g., on a cloud network) so both tests and test results can be shared across team members instead of being accessible only to a single team member running the tests on a local device.

One significant limitation of using an API driven headless browser is an inability to provide particular types of data or to securely fill input fields. In particular, passing sensitive data, such as passwords, credit card data, social security numbers (SSNs), or other personally identifiable information, over networks through an API call can be risky from a security perspective. Additionally, dynamically requested data, such as completely automated public Turing test to tell computers and humans apart (CAPTCHA) data, two way authentication data, files to be uploaded (e.g., a driving license photo), currently cannot be supplied to headless browsers, which negatively impacts the ability to use headless browsers to test certain web applications.

SUMMARY

A method for improved web application testing using remote headless browsers is disclosed that is implemented by one or more dashboard servers and includes initiating a test of a web application on a runner server in response to a command. A test action associated with the test includes a user input trigger and a hint. A user input request, generated when the user input trigger is encountered during execution of the test with a headless browser, is received from the runner server. The user input request includes a session identifier and the hint. Input data is obtained from a user device via an input field that is output along with the hint to an input panel provided to the user device. The input panel is associated with the session identifier. The input data is then sent to the runner server in response to the user input request.

A dashboard server is disclosed that includes memory including programmed instructions stored thereon and one or more processors configured to be capable of executing the stored programmed instructions to initiate a test of a web application on a runner server in response to a command. A test action associated with the test includes a user input trigger and a hint. A user input request, generated when the user input trigger is encountered during execution of the test with a headless browser, is received from the runner server. The user input request includes a session identifier and the hint. Input data is obtained from a user device via an input field that is output along with the hint to an input panel provided to the user device. The input panel is associated with the session identifier. The input data is then sent to the runner server in response to the user input request.

A non-transitory computer readable medium having stored thereon instructions for improved web application testing using remote headless browsers is disclosed that includes executable code that, when executed by one or more processors, causes the one or more processors to initiate a test of a web application on a runner server in response to a command. A test action associated with the test includes a user input trigger and a hint. A user input request, generated when the user input trigger is encountered during execution of the test with a headless browser, is received from the runner server. The user input request includes a session identifier and the hint. Input data is obtained from a user device via an input field that is output along with the hint to an input panel provided to the user device. The input panel is associated with the session identifier. The input data is then sent to the runner server in response to the user input request.

This technology provides a number of advantages including methods, non-transitory computer readable media, and dashboard servers that facilitate more effective and efficient testing of web applications using remote headless browsers. With this technology, remote headless browsers can be used to more securely test web applications that require users to enter sensitive and other types of data, as well as complete complex input tasks. Additionally, this technology advantageously utilizes group chat functionality to allow headless browsers executed in remote locations to more effectively reach users available to facilitate web application tests.

DETAILED DESCRIPTION

Figure 1:
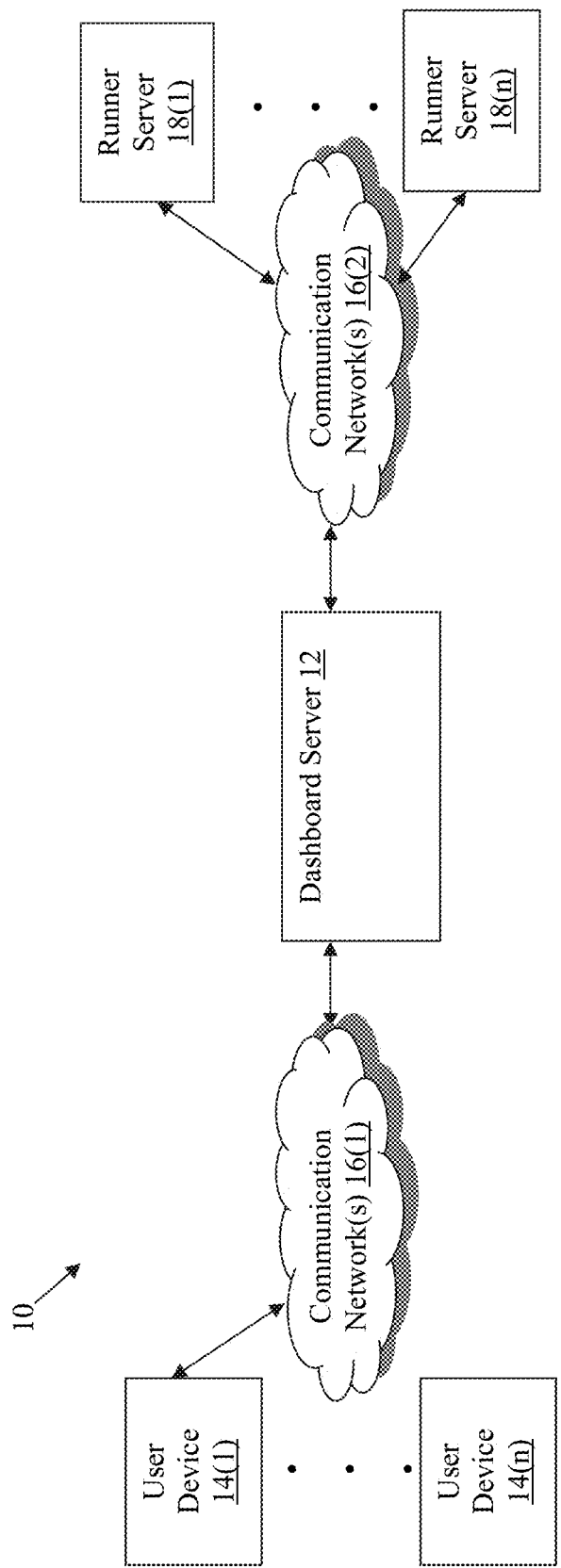
FIG. 1 is a block diagram of an exemplary network environment with a dashboard server and a plurality of runner servers.

Referring to FIG. 1, an exemplary network environment 10 that includes a dashboard server 12 that is coupled to user devices **14(1)-14(*n*), via communication network(s) 16(1), and a plurality of runner servers 18(1)-18(n), via communication networks 16(2). In other examples, the user devices 14(1)-14(n), dashboard server 12, and runner servers 18(1)-18(n) may be coupled together via other topologies. The network environment 10** may include other network devices such as one or more routers or switches, for example, which are known in the art and thus will not be described herein. This technology provides a number of advantages including methods, non-transitory computer readable media, and dashboard servers that facilitate improved, secure testing of web applications using remote headless browsers.

In this particular example, the user devices 14(1)-14(n), dashboard server 12, and runner servers 18(1)-18(n) are disclosed in FIG. 1 as dedicated hardware devices. However, one or more of the user devices 14(1)-14(n), dashboard server 12, or runner servers 18(1)-18(n) can also be implemented in software within one or more other devices in the network environment 10. As one example, one or more of the runner servers 18(1)-18(n), as well as any of its components or applications, can be implemented as software executing on the dashboard server 12, and many other permutations and types of implementations can also be used in other examples.

Figure 2:
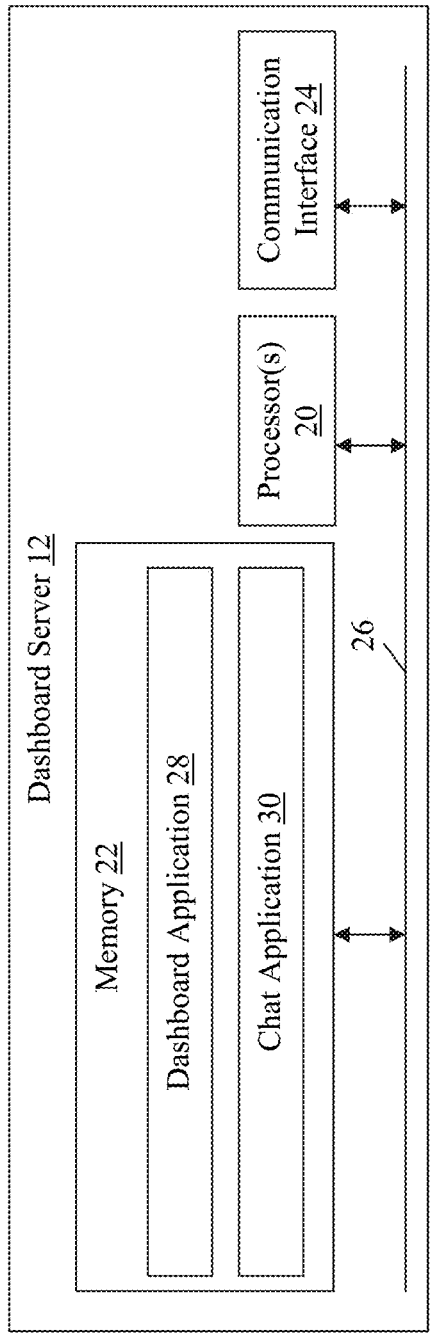
FIG. 2 is a block diagram of an exemplary dashboard server.

Referring to FIGS. 1-2, the dashboard server 12 of the network environment 10 may perform any number of functions, including providing graphical user interfaces (GUIs) to the user devices 14(1)-14(n), and communicating with the runner servers 18(1)-18(n) to facilitate testing of web applications. The dashboard server 12 in this example includes one or more processor(s) 20, a memory 22, and a communication interface 24, which are coupled together by a bus 26, although the dashboard server 12 can include other types or numbers of elements in other configurations.

The processor(s) 20 of the dashboard server 12 may execute programmed instructions stored in the memory 22 of the dashboard server 12 for any number of the functions described and illustrated herein. The processor(s) 20 may include one or more central processing units (CPUs) or general purpose processors with one or more processing cores, for example, although other types of processor(s) can also be used.

The memory 22 of the dashboard server 12 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 20, can be used for the memory 22.

Accordingly, the memory 22 of the dashboard server 12 can store one or more applications that can include computer executable instructions that, when executed by the dashboard server 12, cause the dashboard server 12 to perform actions, such as to transmit, receive, or otherwise process network messages and requests, for example, and to perform other actions described and illustrated below with reference to FIGS. 4-15. The application(s) can be implemented as components of other applications. Further, the application(s) can be implemented as operating system extensions, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the dashboard server 12 itself, may be located in virtual server(s) running in a cloud-based computing environment rather than being tied to one or more specific physical network computing devices. Also, the application(s) may be running in one or more virtual machines (VMs) executing on the dashboard server 12. Additionally, in one or more examples of this technology, virtual machine(s) running on the dashboard server 12 may be managed or supervised by a hypervisor.

In this particular example, the memory 20 of the dashboard server 12 includes a dashboard application 28 and a chat application 30. The dashboard application 28 provides GUI(s), such as an input panel, for example, to users of the user devices 14(1)-14(n), which can include web application developers or testers. The dashboard application 28 in this example receives test data for a web application, including test actions to be performed with respect to the web application and test configuration data. Subsequently, the dashboard application 28 receives a command from one of the user devices 14(1)-14(n) and schedules a test of a web application on one of the runner servers 18(1)-18(n).

During a web application test, the dashboard application 28 is further configured to communicate with the chat application 30 through a communication channel (e.g., web sockets) to update GUI(s) or panel(s) provided to one of the user devices 14(1)-14(n), based on requests sent from one of the runner servers 18(1)-18(n). In particular, the dashboard application 28 can update an input panel based on test progress information communicated from one of the runner servers 18(1)-18(n) and via the chat application 30.

Additionally, the dashboard application 28 can facilitate input of data (e.g., sensitive data, such as a password) from an input panel that is communicated to one of the runner servers 18(1)-18(n) via the chat application 30 to be used by one of the headless browsers 40(1)-40(n) during a web application test. Following test completion, the dashboard application 28 is configured to provider one of the user devices 14(1)-14(n) with recorded web pages and test analysis results for a test to allow a user of the one of the user devices 14(1)-14(n) to analyze (e.g., debug, improve, or update) the tested web application.

The chat application 30 in this example communicates with one of the runner servers 18(1)-18(n) executing a web application test to receive a request to invite users of the user devices 18(1)-18(n) when a user data input is required. The chat application 30 is configured to provide GUI(s) (e.g., a chat panel) to the user devices 14(1)-14(n) to communicate the invitations based on test configuration data. Following receipt of an acceptance of the invitation from one of the user devices 14(1)-14(n), the chat panel 30 opens a communication channel with the dashboard application 28 and returns a session identifier (ID) of an input panel associated with the one of the user devices 14(1)-14(n) to the one of the runner servers 18(1)-18(n).

Subsequently, the chat panel 30 can facilitate the exchange of requests and data between the one of the user devices 14(1)-14(n) and the one of the runner servers 18(1)-18(n) and, more specifically, one of the headless browsers 40(1)-40(n) executing a web application test on the one of the runner servers 18(1)-18(n). Following a test completion request from the one of the runner servers 18(1)-18(n), the chat panel 30 communicates the test completion to the one of the user devices 14(1)-14(n) (e.g., via a chat panel), and communicates with the dashboard application 28 to initiate closure of an input panel corresponding to a session ID included in the test completion request. The operation of the dashboard application 18 and the chat application 30 is described and illustrated in more detail later with reference to FIGS. 5-14.

The communication interface 24 of the dashboard server 12 operatively couples and communicates between the dashboard server 12, user devices 14(1)-14(n), and runner servers 18(1)-18(n), which are coupled together at least in part by the communication network(s) 16(1) and 16(2), although other types or numbers of communication networks or systems with other types or numbers of connections or configurations to other devices or elements can also be used.

By way of example only, the communication network(s) 16(1) and 16(2) can include local area network(s) (LAN(s)) or wide area network(s) (WAN(s)), and can use TCP/IP over Ethernet and industry-standard protocols, although other types or numbers of protocols or communication networks can be used. The communication network(s) 16(1) and 16(2) in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

While the dashboard server 12 is illustrated in this example as including a single device, the dashboard server 12 in other examples can include a plurality of devices each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the dashboard server 12. Additionally, one or more of the devices that together comprise the dashboard server 12 in other examples can be standalone devices or integrated with one or more other devices or apparatuses.

Figure 3:
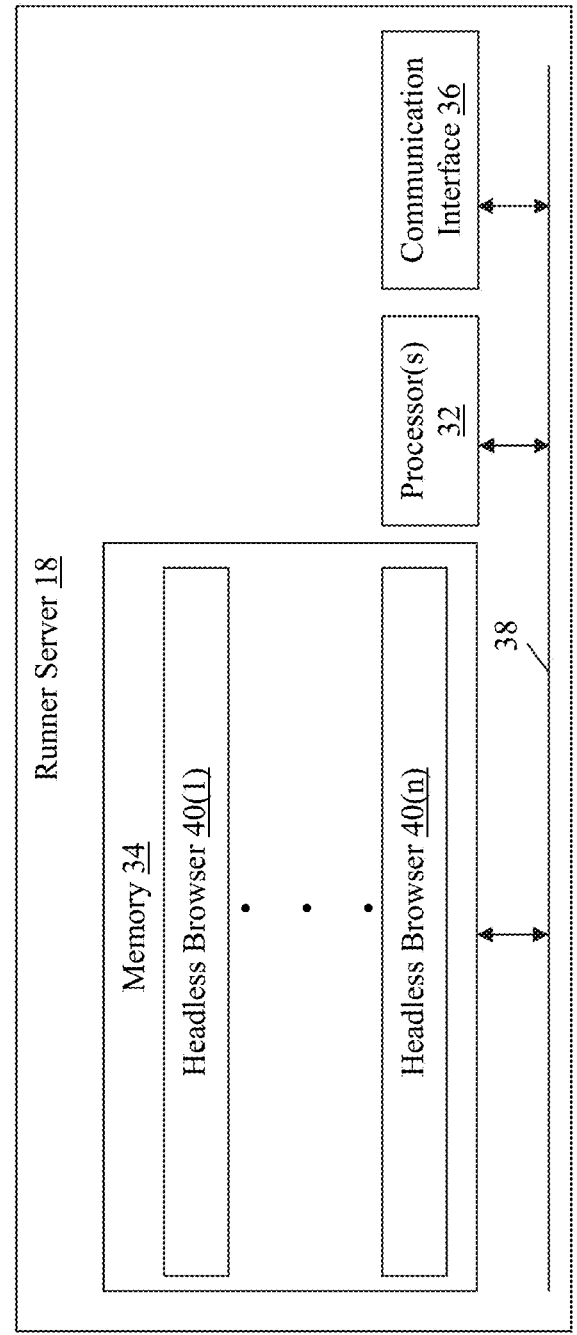
FIG. 3 is a block diagram of an exemplary runner server.

Referring to FIGS. 1 and 3, the exemplary runner server 18 of the network environment 10 may perform any number of functions, including communicating with the dashboard server 12 to and executing web application tests by obtaining and analyzing web pages associated with web applications from external web servers (not shown). The runner server 18 in this example includes one or more processor(s) 32, a memory 34, and a communication interface 36, which are coupled together by a bus 38, although the runner server 18 can include other types or numbers of elements in other configurations.

The processor(s) 32 of the runner server 18 may execute programmed instructions stored in the memory 34 of the runner server 18 for any number of the functions described and illustrated herein. The processor(s) 32 may include one or more central processing units (CPUs) or general purpose processors with one or more processing cores, for example, although other types of processor(s) can also be used.

The memory 34 of the runner server 18 stores these programmed instructions for one or more aspects of the present technology as described and illustrated herein, although some or all of the programmed instructions could be stored elsewhere. A variety of different types of memory storage devices, such as RAM, ROM, hard disk, solid state drives, flash memory, or other computer readable medium which is read from and written to by a magnetic, optical, or other reading and writing system that is coupled to the processor(s) 32, can be used for the memory 34.

Accordingly, the memory 34 of the runner server 18 can store one or more applications that can include computer executable instructions that, when executed by the runner server 18, cause the runner server 18 to perform actions, such as to transmit, receive, or otherwise process network messages, for example, and to perform other actions described and illustrated below with reference to FIGS. 4-15. The application(s) can be implemented as components of other applications. Further, the application(s) can be implemented as operating system extensions, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the runner server 18 itself, may be located in virtual server(s) running in a cloud-based computing environment rather than being tied to one or more specific physical network computing devices. Also, the application(s) may be running in one or more VMs executing on the runner server 18. Additionally, in one or more examples of this technology, virtual machine(s) running on the runner server 18 may be managed or supervised by a hypervisor.

In this particular example, the memory 34 of the runner server 18 includes headless browsers 40(1)-40(n). The headless browsers 40(1)-40(n) in this example are lightweight web browser and are also referred to emulated browsers or BOTs. The headless browsers 40(1)-40(n) are configured to obtain and execute web pages and other content, but do not include a (GUI). In this example, the headless browsers 40(1)-40(n) are used by the runner server 18 to automatically execute scheduled test actions defined in tests of web applications without providing any graphical output or display.

In some examples, the runner server 18 can share data with the headless browsers 40(1)-40(n) via files in a working directory of the memory 34, and the headless browsers 40(1)-40(n) can communicate messages to the runner server 18 via a console output, for example, as described and illustrated in more detail later. While the headless browsers 40(1)-40(n) are illustrated in FIG. 3 as within the memory 34 of the runner server 18, in other examples the headless browsers 40(1)-40(n) can be hosted remotely from, or external to, the runner server 18.

The communication interface 36 of the runner server 18 operatively couples and communicates between the runner server 18 and dashboard server, which are coupled together at least in part by the communication network(s) 16(2), although other types or numbers of communication networks or systems with other types or numbers of connections or configurations to other devices or elements can also be used.

While the runner server 18 is illustrated in this example as including a single device, the runner server 18 in other examples can include a plurality of devices each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the runner server 18. Additionally, one or more of the devices that together comprise the runner server 18 in other examples can be standalone devices or integrated with one or more other devices or apparatuses.

Accordingly, the runner server 18 may be hardware or software or may represent a system with multiple servers in a pool, which may include internal or external networks. Moreover, the runner server 18 is not limited to a particular configuration and may contain network computing devices that operate using a master/slave approach, whereby one of the network computing devices of the runner server 18 operate to manage or otherwise coordinate operations of the other network computing devices. The runner server 18 may operate as a plurality of network computing devices within a cluster architecture, a peer-to peer architecture, virtual machines, or within a cloud architecture, for example.

Each of the user devices 14(1)-14(n) of the network environment 10 in this example includes any type of computing device that can exchange network data, such as mobile, desktop, laptop, or tablet computing devices, virtual machines (including cloud-based computers), or the like. Each of the user devices 14(1)-14(n) in this example includes a processor, a memory, and a communication interface, which are coupled together by a bus or other communication link (not illustrated), although other numbers or types of components could also be used.

Each of the user devices 14(1)-14(n) may run interface applications, such as standard web browsers or standalone client applications, which may provide an interface to communicate with the dashboard server 12 via the communication network(s) 16(1). Each of the user devices 14(1)-14(n) may further include a display device, such as a display screen or touchscreen, or an input device, such as a keyboard or mouse, for example (not illustrated).

Although the exemplary network environment 10 with the user devices 14(1)-14(n), dashboard server 12, runner servers 18(1)-18(n), and communication network(s) 16(1) and 16(2) are described and illustrated herein, other types or numbers of systems, devices, components, or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network security system 10, such as the user devices 14(1)-14(n), dashboard server 12, or runner servers 18(1)-18(n), for example, may be configured to operate as virtual instances on the same physical machine. In other words, one or more of the user devices 14(1)-14(n), dashboard server 12, or runner servers 18(1)-18(n) may operate on the same physical device rather than as separate devices communicating through communication network(s) 16(1) or 16(2). Additionally, there may be more or fewer user devices, dashboard servers, or runner servers than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, PDNs, the Internet, intranets, and combinations thereof.

The examples may also be embodied as one or more non-transitory computer readable media having instructions stored thereon, such as in the memory 22 or 34, for one or more aspects of the present technology, as described and illustrated by way of the examples herein. The instructions in some examples include executable code that, when executed by one or more processors, such as the processor(s) 20 or 32, cause the processors to carry out steps necessary to implement the methods of the examples of this technology that are described and illustrated herein.

Figure 4:
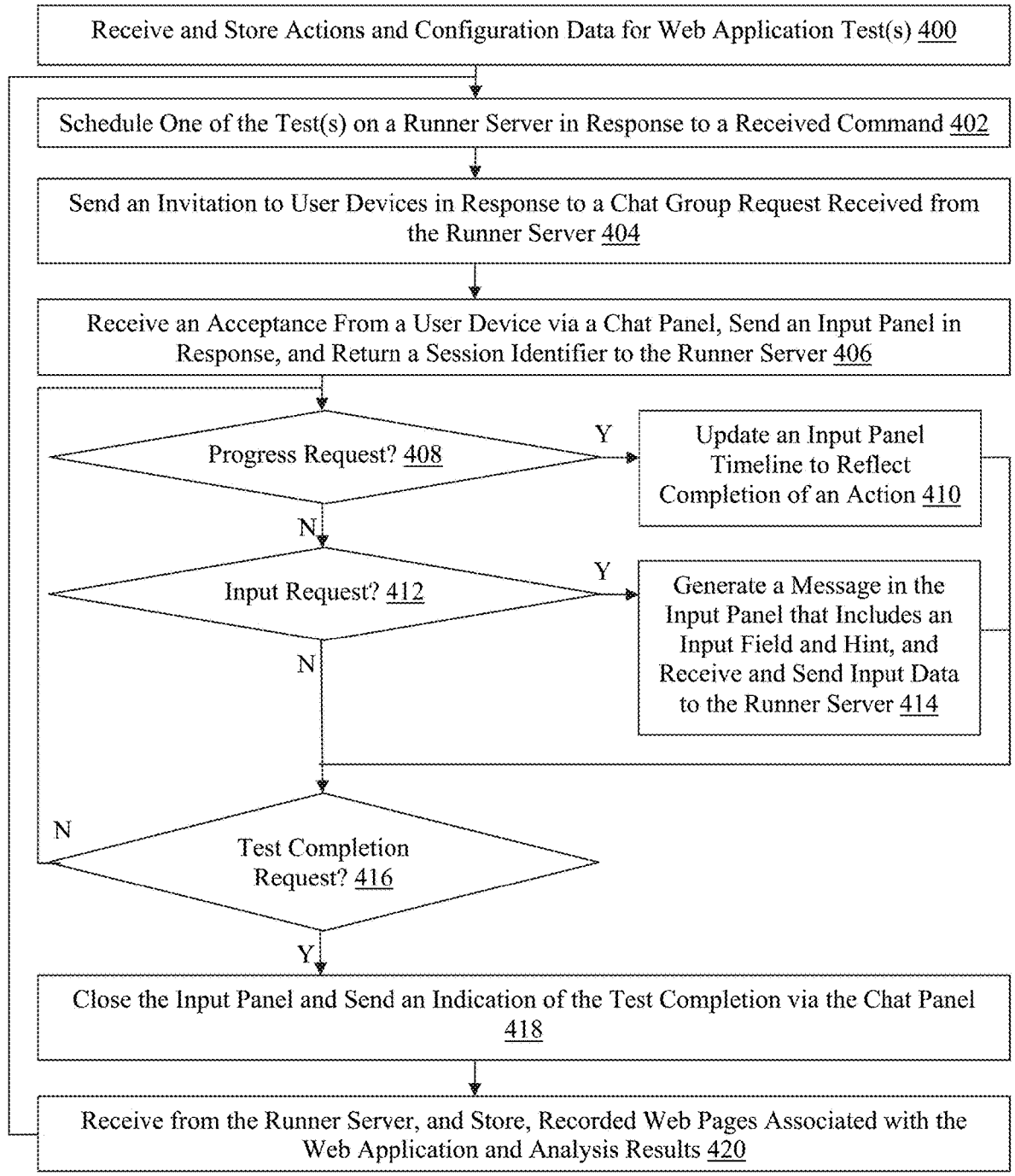
FIG. 4 is a flowchart of an exemplary method for facilitating, by a dashboard server, improved web application testing.

Referring more specifically to FIG. 4, a flowchart of an exemplary method of facilitating, by the dashboard server 12, improved web application testing is illustrated. In step 400 in this example, the dashboard server 12 receives and stores actions and configuration data for at least one test to be performed on at least one web application, or web site, which has associated web page(s). The test in this example includes a plurality of test actions or steps to be taken, such as interactions with particular web pages elements associated with the web application to be tested.

While initiating the test actions, the test is configured to analyze the tested web application, such as with respect to performance, accessibility, or source code errors, for example, and to record a result of the analysis along with the visited web page or other types of web application interactions. The test further defines triggers that result in messages to one of the runner servers 18(1)-18(n) when encountered by one of the headless browsers 40(1)-40(n) during test execution, including progress and user input triggers in this example, although other types of triggers can also be defined.

The progress trigger can result in a progress message being issued to one of the runner servers 18(1)-18(n). The progress triggers and messages can be associated with particular test actions and allow a user of one of the user devices 14(1)-14(n) to determine the status of the web application test, as described and illustrated in more detail later. The user input triggers define a hint based on a web page element in this example, and the user input messages facilitate input of data by a user of one of the user devices 14(1)-14(n), also as described and illustrated in more detail later.

The test configuration data in this example can include test details and parameters including a starting URL for the test, HTTP headers and connection parameters, whether overlays should be ignored during the test, any blacklisted resources or domain restrictions, and a definition of a chat group, for example, although other types of configuration data can also be obtained and stored in step 400. The chat group includes users of one or more of the user devices 14(1)-14(n) that can be used to facilitate the testing of the web application (e.g., by providing user input data when prompted).

Figure 5:
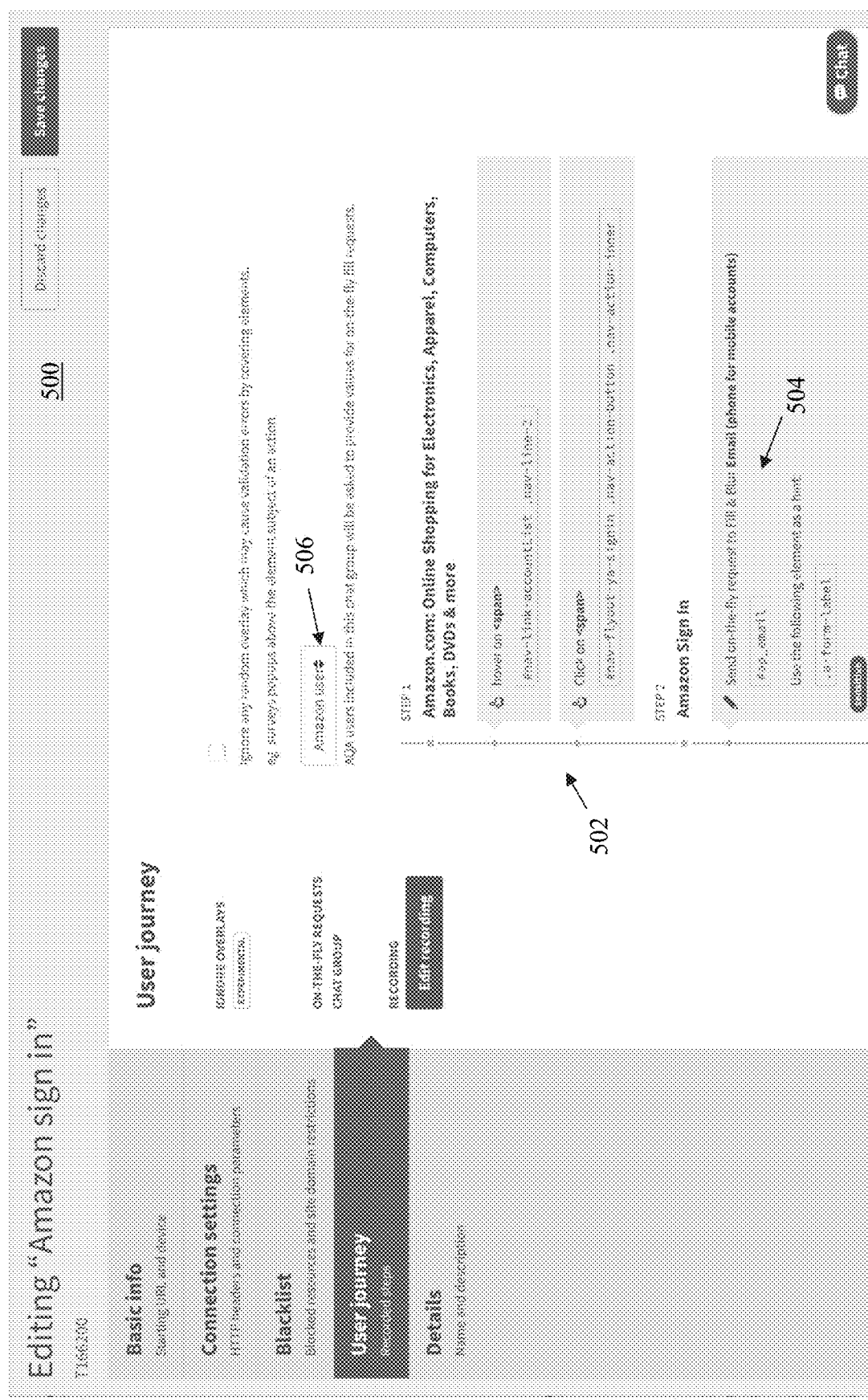
FIG. 5 is a screen shot of an exemplary web application test configuration interface.

Referring more specifically to FIG. 5, a screen shot of an exemplary web application test configuration interface 500 is illustrated. The test configuration interface 500 can be provided by the dashboard application 28 to one of the user devices 14(1)-14(n) to facilitate entry, by a user of the one of the user devices 14(1)-14(n) (e.g., a tester or developed), of the test actions and/or test configuration data for a particular web application test. In the particular example described and illustrated herein, the test is of a sign in process for an e-commerce web application.

A subset of the test actions 502 include steps relating to the sign in process, such as hovering and clicking on particular elements of web pages associated with the web application. The test actions 502 include a user input trigger 504 in this example, which prompts one of the headless browsers 40(1)-40(n) to initiate a user input message, which is referred to in FIG. 5 and elsewhere herein as an "on-the-fly" request. The user input trigger 504 in this particular example relates to input of an e-mail address (or a phone number for mobile accounts) and defines a hint corresponding to the label of the web page element associated with the e-mail input (e.g., the input field). In another example, the hint can be static or stored and retrieved based on an index of an associated test action, and other types of user input triggers and hints can be used in other examples.

Additionally, the test configuration interface 500 in this example facilitates definition, by a user of one of the user devices 14(1)-14(n), of a user or chat group to be contacted to provide user input data, such as the e-mail address associated with the user input trigger 504, for example. In this particular example, the user or chat group is defined as all users of the web application using a drop-down menu 506, although other methods of defining a chat group can also be used in other examples. The chat group can include a set of tests of a particular web application that are utilizing the user devices 14(1)-14(n), for example. The web application test can be scheduled and asynchronously executed, with any of the defined chat group facilitating the execution by providing user input data, for example, as described and illustrated in more detail later.

Referring back to FIG. 4, in step 402, the dashboard server 12 schedules one of the web application tests received and stored in step 400 for execution on one of the runner servers 18(1)-18(n). The dashboard server 12 can received a command from one of the user devices 14(1)-14(n) to schedule the test, such as via a provided GUI for example. The dashboard server 12 can send the test actions and other portions of the test configuration data to one of the runner servers 18(1)-18(n) as part of a request to schedule the test. The test can be scheduled by the dashboard server 12 or the one of the runner servers 18(1)-18(n) to be executed at a later time or asynchronously with respect to the received command, for example.

In step 404, the dashboard server 12 sends an invitation to one or more of the user devices 14(1)-14(n) in response to a chat group request received from the one of the runner servers 18(1)-18(n). Upon initiating the web application test, the one of the runner servers 18(1)-18(n) evaluates the associated test configuration data, determines that a chat group is defined, and requests that the dashboard server 12 initiate invitation to the members in the chat group. In response, the dashboard server 12 in this example sends an invitation via a chat panel provided by the chat application to the one or more of the user devices 14(1)-14(n) associated with the chat group members. The dashboard server 12 can obtain an indication of the chat group members from local storage following storage of the test configuration data in step 400, for example.

Figure 6:
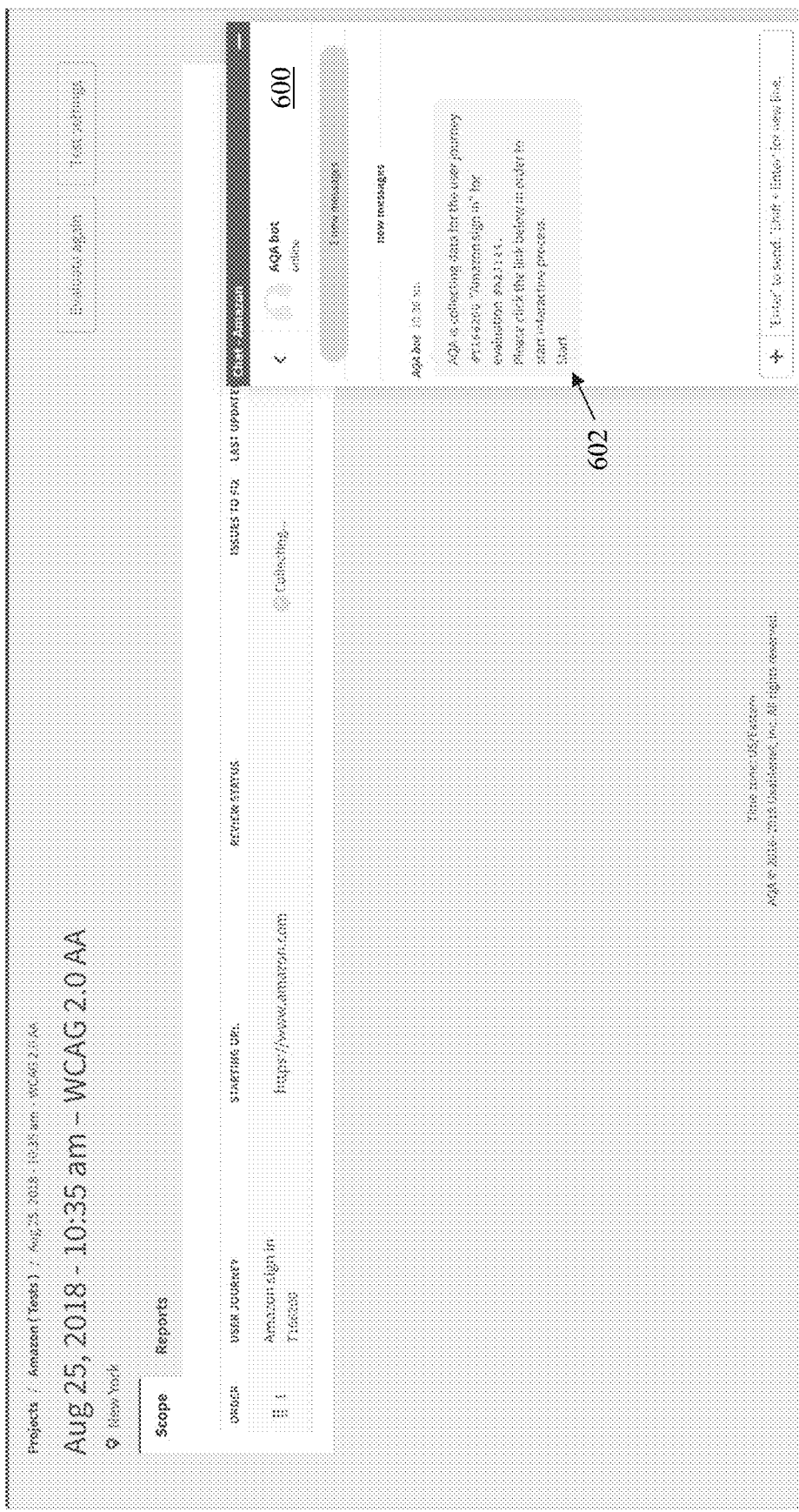
FIG. 6 is a screen shot of an exemplary chat panel illustrating an exemplary invitation to a user to facilitate a web application test.

Referring more specifically to FIG. 6, a screen shot of an exemplary chat panel 600 illustrating an exemplary invitation to a user to facilitate a web application test is illustrated. In this example, the one of the runner servers 18(1)-18(n) sends the chat group request to the chat application 30, which proceeds to open communication channels with each of the one or more of the user devices 14(1)-14(n) in order to initiate an invitation messages through the chat panel 600. The chat panel 600 in this example also facilitates acceptance of an invitation based on an acceptance element 602, such as a start button or link provided as part of the invitation message from the chat application 30. In some examples, the chat panel 600 also can facilitate communications between users of the user devices 14(1)-14(n) (e.g., web application developers collectively testing a web application).

In step 406, the dashboard server 12 receives an acceptance of the invitation from one of the user devices 14(1)-14(n) associated with one of the users in the chat group defined in the test configuration data for the test. In response to the acceptance, the dashboard server 12 sends an input panel to the one of the user devices 14(1)-14(n). In response to the chat group request received in step 404, the dashboard server 12 returns a generated session identifier (ID) to the one of the runner servers 18(1)-18(n). The dashboard server 12 maintains the session ID as associated with the provided input panel. Optionally, the chat application 30 can open a communication channel with the dashboard application 28, and associate the communication channel with the session ID.

In examples in which an acceptance of an invitation is not be received from any of the user devices 14(1)-14(n), the test can be stopped before resources are allocated by the one of the runner servers 18(1)-18(n). Additionally, the one of the user devices 14(1)-14(n) from which the command is received in step 402 can be different than another of the user devices 14(1)-14(n) from which the acceptance of the invitation was received in step 406. Accordingly, this technology facilitates asynchronous scheduling and testing of web applications such that any available user can facilitate a test (e.g., by providing user input data as described and illustrated in more detail below) at any time subsequent to a test being scheduled.

In some examples, the communications between the dashboard application 28 and the user devices 14(1)-14(n), and between the dashboard server 12 and the one of the runner servers 18(1)-18(n), (e.g., in steps 402 and 404) can be based on HTTP, although other types of protocols can also be used. Additionally, the communications between the chat application 30 and the user devices 14(1)-14(n), and between the chat application 30 and dashboard application 28, (e.g., in step 406 and steps 410, 414, and 418, as described and illustrated in more detail later) can be via web sockets, although other types of communication protocols and channels can be used in other examples.

In step 408, the dashboard server 12 determines whether a progress request is received from the one of the runner servers 18(1)-18(n). The progress request can be sent following receipt by the one of the runner servers 18(1)-18(n) of a progress message associated with a progress trigger encountered by one of the headless browsers 40(1)-40(n), as described and illustrated in more detail later. The progress request in this example can be received by the chat application 30 from the one of the runner servers 18(1)-18(n) and includes a session ID and optionally an indication of a test action that has been completed. If the dashboard server 12 determines that a progress request has been received, then the Yes branch is taken to step 410.

In step 410, the dashboard server 12 updates a timeline of an input panel to reflect completion of a test action. The input panel can be identified based on the session ID, which the chat panel 30 previously associated with a particular communication channel (e.g., web socket connection) with the dashboard application 28, for example. Accordingly, the dashboard application 28 can receive information associated with the progress request, such as the completed test action, via a communication channel corresponding to a particular input panel, and can update the input panel provided to the one of the user devices 14(1)-14(n) to reflect the test progress. The input panel was provided to the one of the user devices 14(1)-14(n) in step 406.

Figure 7:
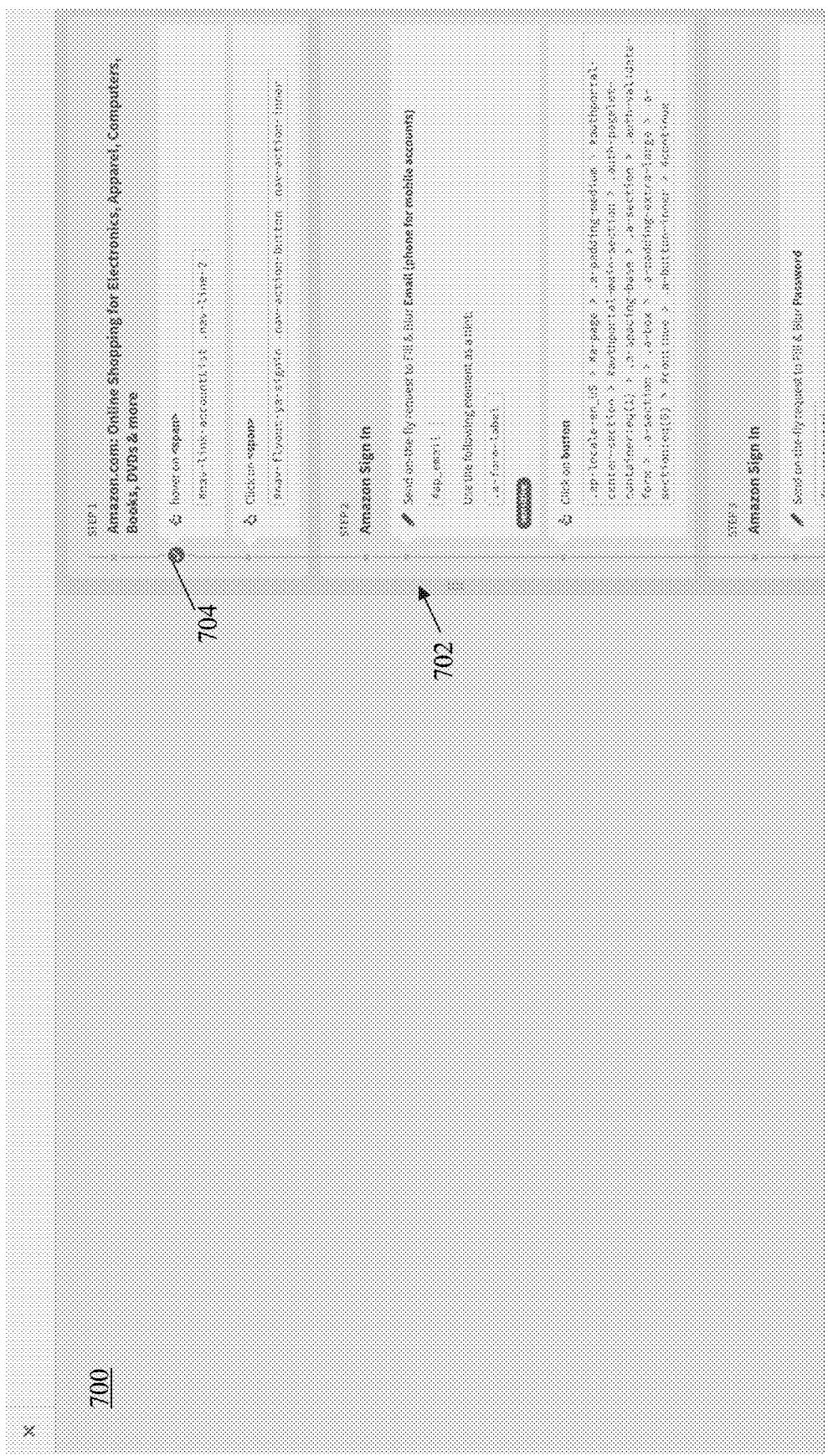
FIG. 7 is a screen shot of an exemplary input panel timeline illustrating progress of a web application test.

Referring more specifically to FIG. 7, a screen shot of an exemplary input panel 700 with a timeline 702 illustrating progress of a web application test is illustrated. Upon providing the input panel 700 with the dashboard application 28, the dashboard server 12 in this example includes a timeline corresponding to test actions associated with the test as obtained in step 400. In this particular example, the dashboard server 12 (e.g., the dashboard application 28) updates the timeline 702 of the input panel 700 to include a checkmark 704 next to a test action following receipt of a progress request (e.g., by the chat application) indicating a session ID associated with the input panel and identifying the particular test action. Other methods of communicating test progress to the one of the user devices 14(1)-14(n) can also be used in other examples.

Referring back to FIG. 4, if the dashboard server 12 determines in step 408 that a progress request has not been received from the one of the runner servers 18(1)-18(n), then the No branch is taken to step 412. In step 412, the dashboard server 12 determines whether an input request has been received from the one of the runner servers 18(1)-18(n). The input request can be sent following receipt by the one of the runner servers 18(1)-18(n) of an input message associated with a user input trigger encountered by one of the headless browsers 40(1)-40(n), as described and illustrated in more detail later. The input request in this example can be received by the chat application 30 from the one of the runner servers 18(1)-18(n) and includes a session ID and a hint. If the dashboard server 12 determines that an input request has been received, then the Yes branch is taken to step 414.

In step 414, the dashboard server 12 updates an input panel to include a popup message. The input panel can be identified based on the session ID, which the chat panel 30 previously associated with a particular communication channel (e.g., web socket connection) with the dashboard application 28, for example. Accordingly, the dashboard application 28 can receive information associated with the progress request, such as the hint included in the received input request and an optional input type, and can update the input panel provided to the one of the user devices 14(1)-14(n) to display the popup message and an associated input field. The input field can be a text input field, associated with a CAPTCHA response, or a file upload field, for example, although other types of input fields can also be included in the popup message.

Optionally, an input type that is part of the hint definition can be included with the input request, and can be used to determine the type of input field that is provided on the popup message. In step 414, the dashboard server 12 further receives input data that is submitted by a user of the one of the user input devices 14(1)-14(n) via the input field. Following receipt of the input data, the dashboard server 12 sends the input data to the one of the runner servers 18(1)-18(n) in response to the received input request.

Figure 8:
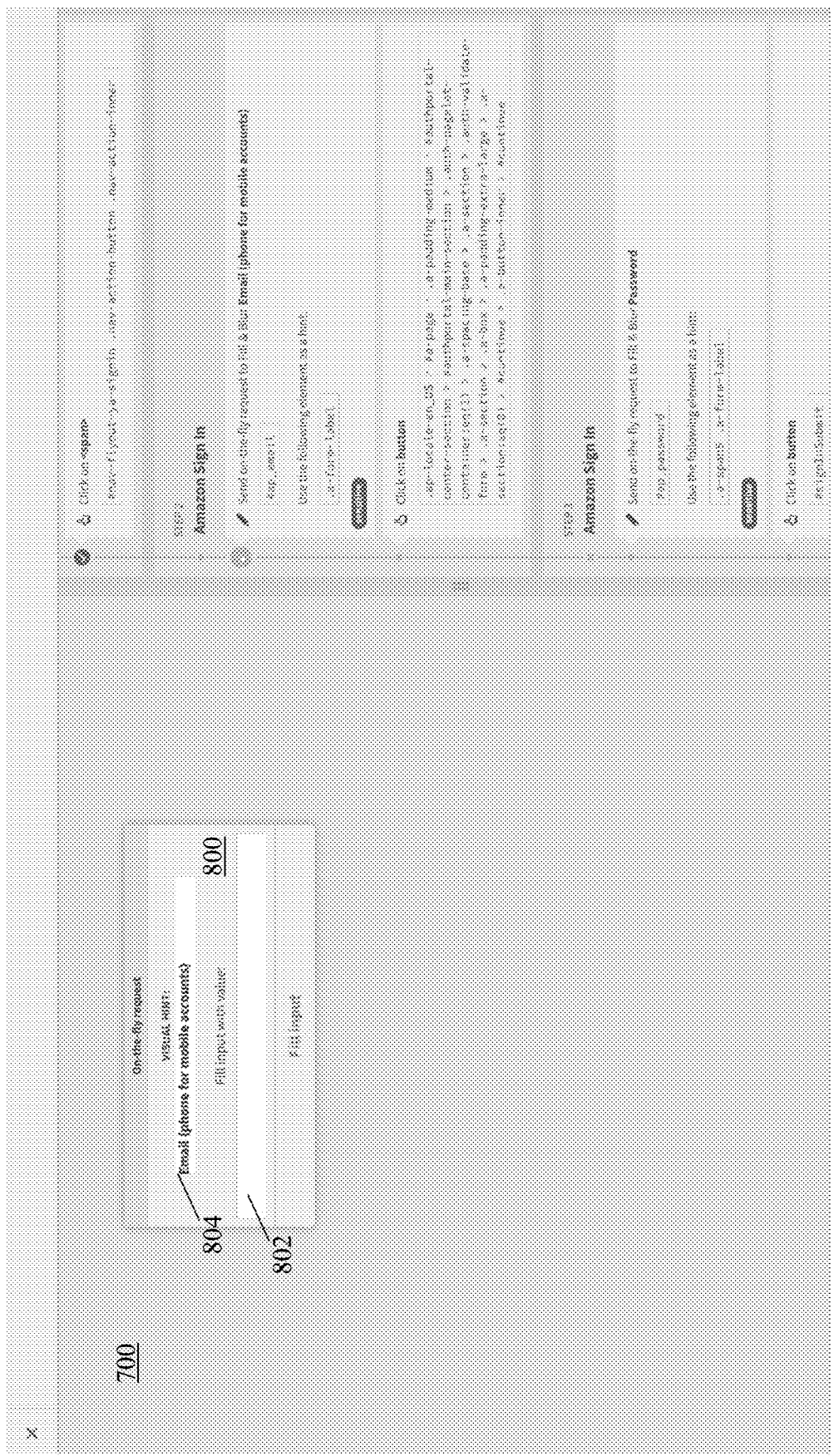
FIGS. 8-9 are screen shots of exemplary input panels illustrating exemplary popup messages for facilitating entry of sensitive user input data.
Figure 9:
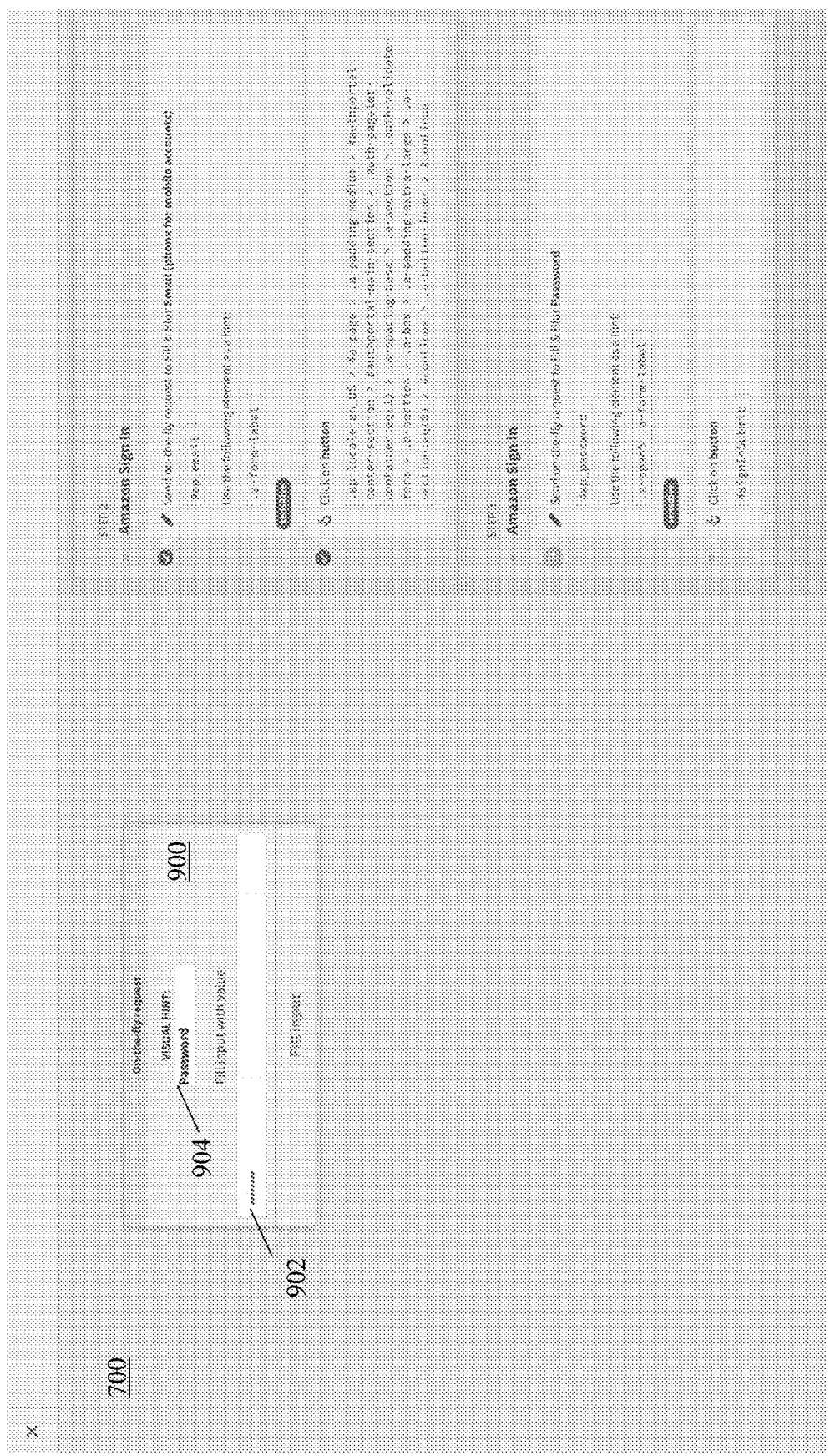

Referring more specifically to FIGS. 8-9, screen shots of the input panel 700 illustrating exemplary popup messages 800 and 900 for facilitating entry of user input data are illustrated. Referring more specifically to FIG. 8, the input panel 700 has been updated with a popup message 800 that includes an input field 802 and a hint 804. The hint indicates that the required input data relates to an e-mail address or phone for mobile accounts.

In FIG. 9, the input panel 700 has been updated with a popup message 900 that includes an input field 902 and a hint 904 indicating that the required input data relates to a password. In this particular example, the popup message 900 is configured to receive and blur or obfuscate the input data. Accordingly, this technology provides for submission of input data (e.g., sensitive data such as user names, passwords, SSNs) via relatively secure communication channels as compared to an API call, to facilitate testing of web applications in remote headless browsers that do not have GUIs and otherwise cannot obtain certain types of user input (e.g., dynamically-requested input), let alone securely.

Referring back to FIG. 4, if the dashboard server 12 determines that an input request has not been received in step 412, then the No branch is taken to step 416. In step 416, the dashboard server 12 determines whether a test completion request has been received from the one of the runner servers 18(1)-18(n). The test completion request can include the session ID and can be sent subsequent to a determination by the one of the runner servers 18(1)-18(n) that the test has completed, as described and illustrated in more detail later.

If the dashboard server 12 determines that a test completion request has not been received, then the No branch is taken back to step 408. Accordingly, in this example, the dashboard server 12 effectively waits for a progress, input, or test completion request to be received from the one of the runner servers 18(1)-18(n). If the dashboard server 12 determines that a test completion request has been received in step 416, then the Yes branch is taken to step 418.

In step 418, the dashboard server 12 closes the input panel associated with the session ID included in the test completion request and sends an indication of the test completion via the chat panel via which the acceptance of the invitation was received in step 406. In this example, the test completion request is received by the chat application 30 and passed to the dashboard application 28 using the communication channel associated with the session ID. The dashboard application 28 then closes the input panel previously provided to the one of the user devices 14(1)-14(n). Additionally, the chat application 30 can close the communication channel with the dashboard application 28.

Figure 10:
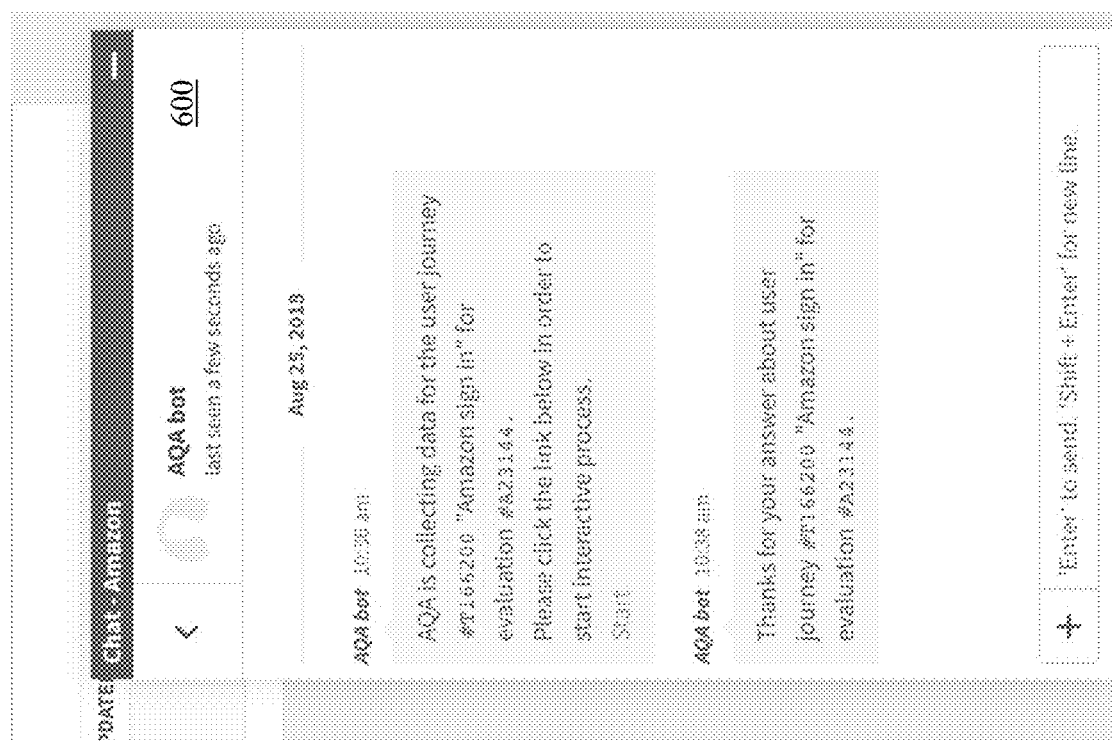
FIG. 10 is a screen shot of an exemplary chat panel following receipt by a dashboard server of a test completion request.

Referring more specifically to FIG. 10, a screen shot of the chat panel 600 following receipt by the dashboard server 12 of a test completion request is illustrated. In this example, the chat application 28 sends a text-based message via the chat panel 600 indicating that the web application has completed, although other methods of communicating the test completion can be used in other examples.

Referring back to FIG. 4, in step 420, the dashboard server 12 receives from the one of the runner servers 18(1)-18(n) recorded web pages associated with the tested web application, as well as analysis results of the test. The dashboard server 12 also stores the recorded web pages and analysis results locally, such as in the memory 22 for example. The recorded web pages and/or analysis results can be sent along with the test completion request, during the test, or upon a separate request from the dashboard server 12 that is initiated by one of the user devices 14(1)-14(n), optionally asynchronously.

In some examples, any user of one of the user devices 14(1)-14(n) can subsequently request an analysis panel or other GUI from the dashboard server 12 in order to review the recorded web pages and analysis results associated with a particular test. Exemplary recorded web pages and analysis results are described and illustrated in more detail later with reference to FIGS. 12-15. Subsequent to receiving and storing the recorded web pages and analysis results in this example, the dashboard server 12 proceeds back to step 402. In other examples, one or more of steps 400-420 can be performed in a different order and/or in parallel.

Figure 11:
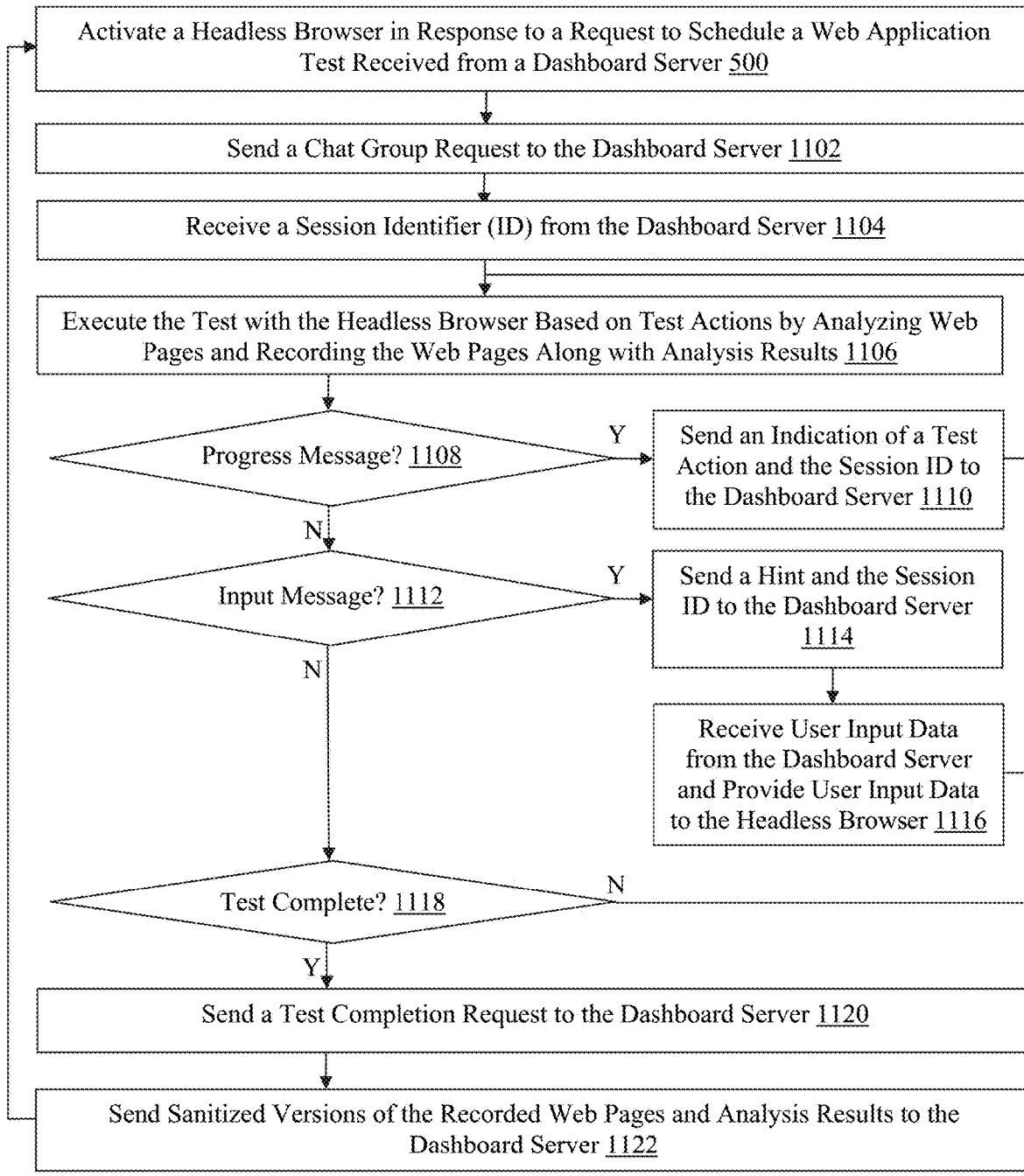
FIG. 11 is a flowchart of an exemplary method for facilitating, by a runner server, improved web application testing using remote headless browsers.

Referring more specifically to FIG. 11, a flowchart of an exemplary method of facilitating, by one of the runner servers 18(1)-18(n), improved web application testing using one of the remote headless browsers 40(1)-40(n) is illustrated. In step 1100 in this example, the one of the runner servers 18(1)-18(n) activates one of the headless browsers 40(1)-40(n) in response to a request to schedule a web application test received from the dashboard server 12. The activation can be asynchronous with respect to receive of the request to schedule the web application test in some examples. The request to schedule the web application test could have been sent by the dashboard server 12 as described and illustrated in more detail earlier with reference to step 402 of FIG. 4, for example.

In step 1102, the one of the runner servers 18(1)-18(n) sends a group chat request to the dashboard server 12. The one of the runner servers 18(1)-18(n) could have been prompted to initiate the group chat request based on test configuration data received along with the request to schedule the web application test, for example. The group chat request could have been received and processed by the dashboard server 12 as described and illustrated earlier with reference to steps 404-406 of FIG. 4, for example.

In step 1104, the one of the runner servers 18(1)-18(n) receives a session ID from the dashboard server 12. Accordingly, the dashboard server 12 invites users of the user devices 14(1)-14(n), based on a defined user or chat group in test configuration data, using the chat application 30 and provided chat panels. Upon receiving an acceptance from one of the user devices 14(1)-14(n), the dashboard server 12 generates a session ID associated with an input panel provided to the one of the user devices 14(1)-14(n) and returns the session ID to the one of the runner servers 18(1)-18(n), as described and illustrated in more detail earlier. The one of the runner servers 18(10-18(n) can then use the session ID to facilitate communication with the particular input panel provided to the one of the user devices 14(1)-14(n).

In step 1106, the one of the runner servers 18(1)-18(n) executes the test with the activated one of the headless browsers 40(1)-40(n). The test is executed based on test actions in order to analyze web pages associated with a web application or web site. The one of the runner servers 18(1)-18(n) also records web pages during execution of the test along, with analysis results associated with the test, and other information can also be maintained in other examples.

In step 1108, the one of the runner servers 18(1)-18(n) determines whether a progress message is received from the one of the headless browsers 40(1)-40(n) during execution of the test. The one of the headless browsers 40(1)-40(n) can send a progress message upon encountering a progress trigger associated with one of the test actions, for example. The progress messages, along with other messages and data described and illustrated herein, can be exchanged between the one of the runner servers 18(1)-18(n) and the one of the headless browsers 40(1)-40(n) via a console output, sharing files via a working directory, or by any other protocol, for example, as explained in more detail earlier. Accordingly, if the one of the runner servers 18(1)-18(n) determines that a progress message is received, then the Yes branch is taken to step 1110.

In step 1110, the one of the runner servers 18(1)-18(n) sends a progress request with an indication of a test action associated with the progress message and the session ID received in step 1104 to the dashboard server 12. The dashboard server 12 can then update the input panel associated with the session ID to reflect the completion of the indicated test action, for example, as described and illustrated in more detail earlier with reference to steps 408-410 of FIG. 4. However, if the one of the runner servers 18(1)-18(n) determines that a progress message has not been received, then the No branch is taken to step 1112.

In step 1112, the one of the runner servers 18(1)-18(n) determines whether an input message has been received from the one of the headless browsers 40(1)-40(n). The one of the headless browsers 40(1)-40(n) can send an input message upon encountering a user input trigger associated with one of the test actions, for example. If the one of the runner servers 18(1)-18(n) determines that an input message is received, then the Yes branch is taken to step 1114.

In step 1114, the one of the runner servers 18(1)-18(n) sends a hint and the session ID received in step 1104 to the dashboard server as part of an input request. The hint is defined in the test action associated with the user input trigger in this example, and corresponds with an aspect (e.g., a label) of an input element of a web page being analyzed as part of the executing web application test. Optionally, an input type (e.g., text or CAPTCHA) can be defined in the test action, or otherwise determined or extracted, and sent to the dashboard server 12 with the input request. The input request can be received and processed by the dashboard server 12 as described and illustrated in more detail earlier with reference to steps 412-414 of FIG. 4.

Subsequent to sending the input request with at least the hint and the session ID to the dashboard server 12, in step 1116, the one of the runner servers 18(1)-18(n) receives user input data from the dashboard server 12 and provides the user input data to the one of the headless browsers 40(1)-40(n) (e.g., via a shared working directory in the memory 34). Accordingly, the user input data is provided to the one of the headless browsers 40(1)-40(n) without an API call in this example. Referring back to step 1112, if the one of the runner servers 18(1)-18(n) determines that an input message has not been received, then the No branch is taken to step 1118.

In step 1118, the one of the runner servers 18(1)-18(n) determines whether the test executed in step 1106 has completed. Subsequent to steps 1110, 1116, or if the one of the runner servers 18(1)-18(n) determines in step 1118 that the test has not completed and the No branch is taken, then the one of the runner servers 18(1)-18(n) proceeds back to step 1106 and continues executing the test with the one of the headless browsers 40(1)-40(n). However, if the one of the runner servers 18(1)-18(n) determines in step 1118 that the test has completed, then the Yes branch is taken to step 1120.

In step 1120, the one of the runner servers 18(1)-18(n) sends a test completion request to the dashboard server 12. The test completion request can include the session ID, and can be received and processed by the dashboard server 12 as described and illustrated in more detail earlier with reference to step 418, for example.

In step 1122, the one of the runner servers 18(1)-18(n) sends sanitized versions of the web pages recorded during the test, as well as the analysis results, to the dashboard server 12. The recorded web pages or analysis results can be sent synchronously with, or asynchronously from, completion of the test. The recorded web pages are sanitized in this example to remove user input data, such as any sensitive user input data that was received in step 1116, for example.

The sanitization can occur upon recording the web pages such that the user input data is used within the web pages obtained and analyzed by the one of the headless browsers 40(1)-40(n), but is not otherwise recorded. In other examples, the recorded web pages can be sanitized in other ways. Accordingly, the user input data is effectively volatile and advantageously not stored in the memory 22 of the dashboard server 12 or the memory 34 of the one of the runner servers 18(1)-18(n). The recorded web pages and analysis results can be received and stored by the dashboard server 12 as described and illustrated in more detail earlier with reference to step 420 of FIG. 4, for example.

Figure 12:
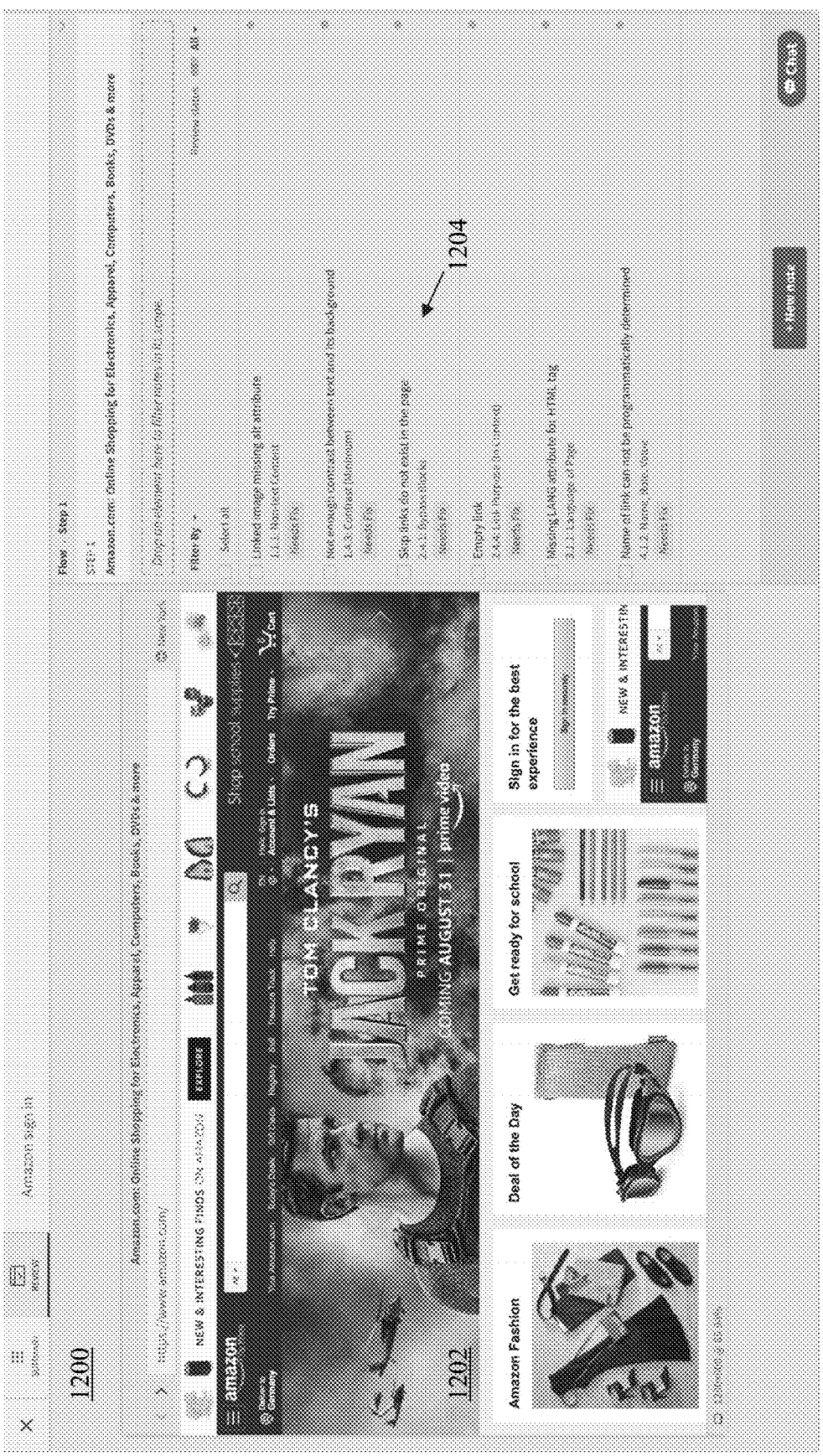
FIGS. 12-15 are recorded web pages, sanitized to remove sensitive user input data, and test analysis results.

Referring more specifically to FIGS. 12-15 recorded web pages, sanitized to remove sensitive user input data, and test analysis results are illustrated. In FIG. 12 a review panel 1200 presenting a recorded home page 1202 associated with the tested web application is illustrated. The review panel 1200 can be provided to one of the user devices 14(1)-14(n) automatically or upon request following completion of a web application test.

A portion of the review panel 1200 in this example includes analysis results 1204 for the analyzed home page 102 of the tested web application. In particular, the analysis results 1204 in this example are presented as corresponding to test actions or steps. Exemplary analysis results 1204 indicate that a linked image is missing an alternate attribute and there is not enough contrast between text and background for a portion of the home page, although other types of analysis results can also be obtained and presented in the review panel 1200 in other examples.

Figure 13:
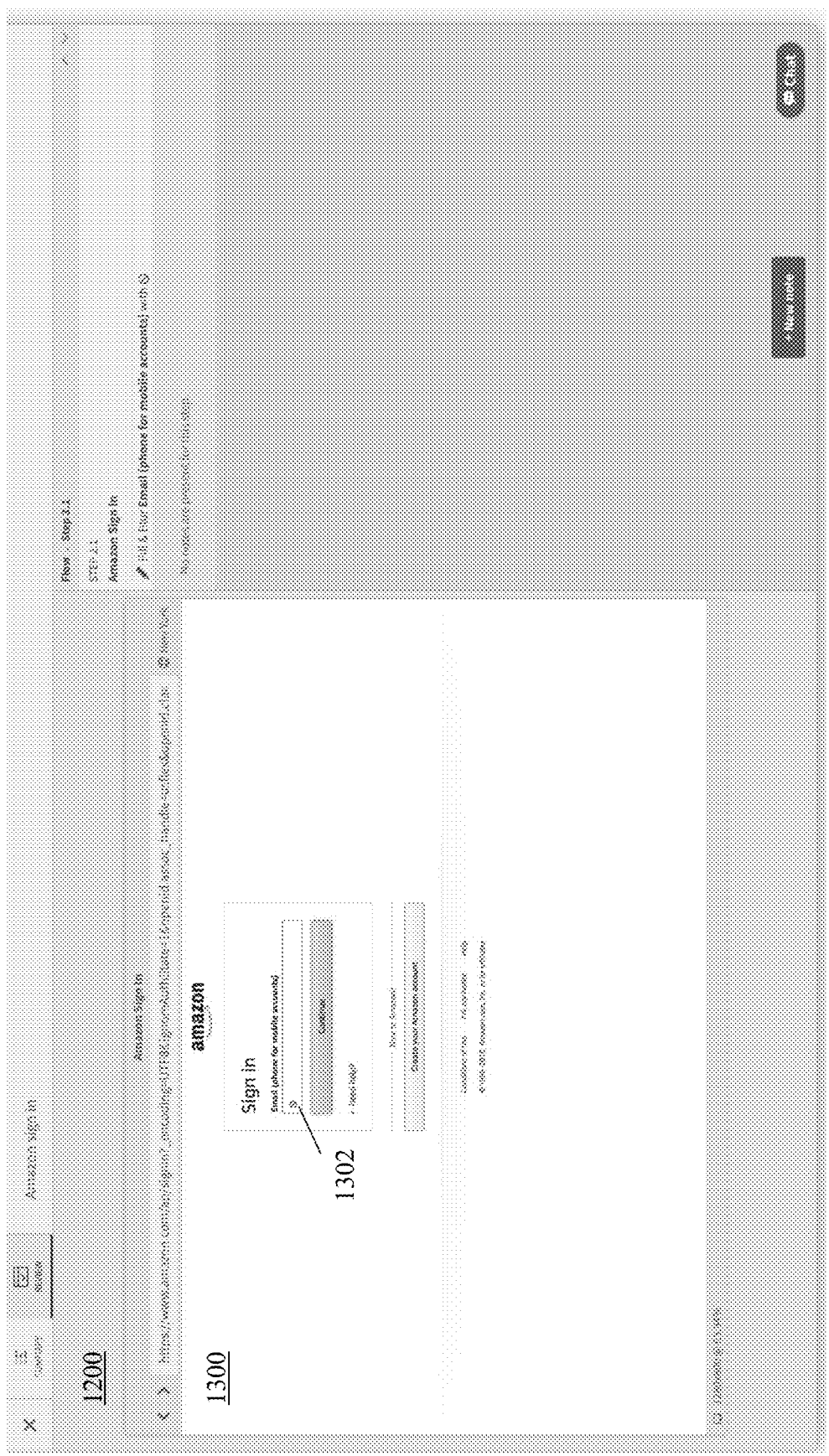

In FIG. 13, the review panel 1200 presenting a recorded email credential entry web page 1300 of the tested web application is illustrated. In this example, although an email address was provided as user input data, as described and illustrated in more detail earlier for example, the email address is not displayed in the email input field 1302 of the recorded email credential entry web page 1300, thereby facilitating improved security for the sensitive data.

Figure 14:
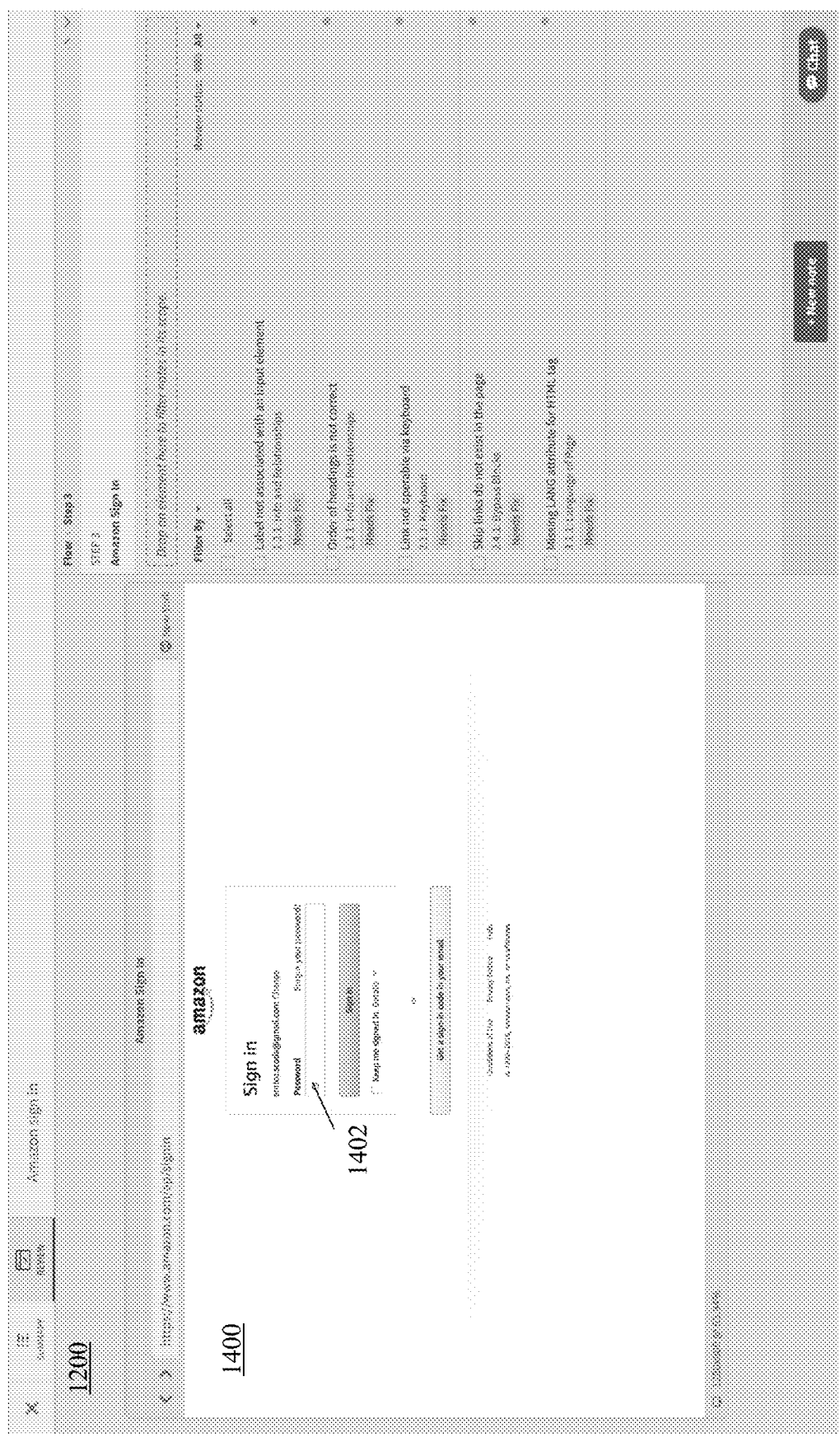

Similarly, the recorded password credential entry web page 1400 of the tested web application presented in the review panel 1200 in FIG. 14 includes a password input field 1402 without displaying the password that was submitted by a user of one of the user input devices 14(1)-14(n) during the web application test. Other methods of obfuscating or other sanitizing sensitive user input data from web pages recorded during a test of an associated web application can also be used in other examples.

Figure 15:
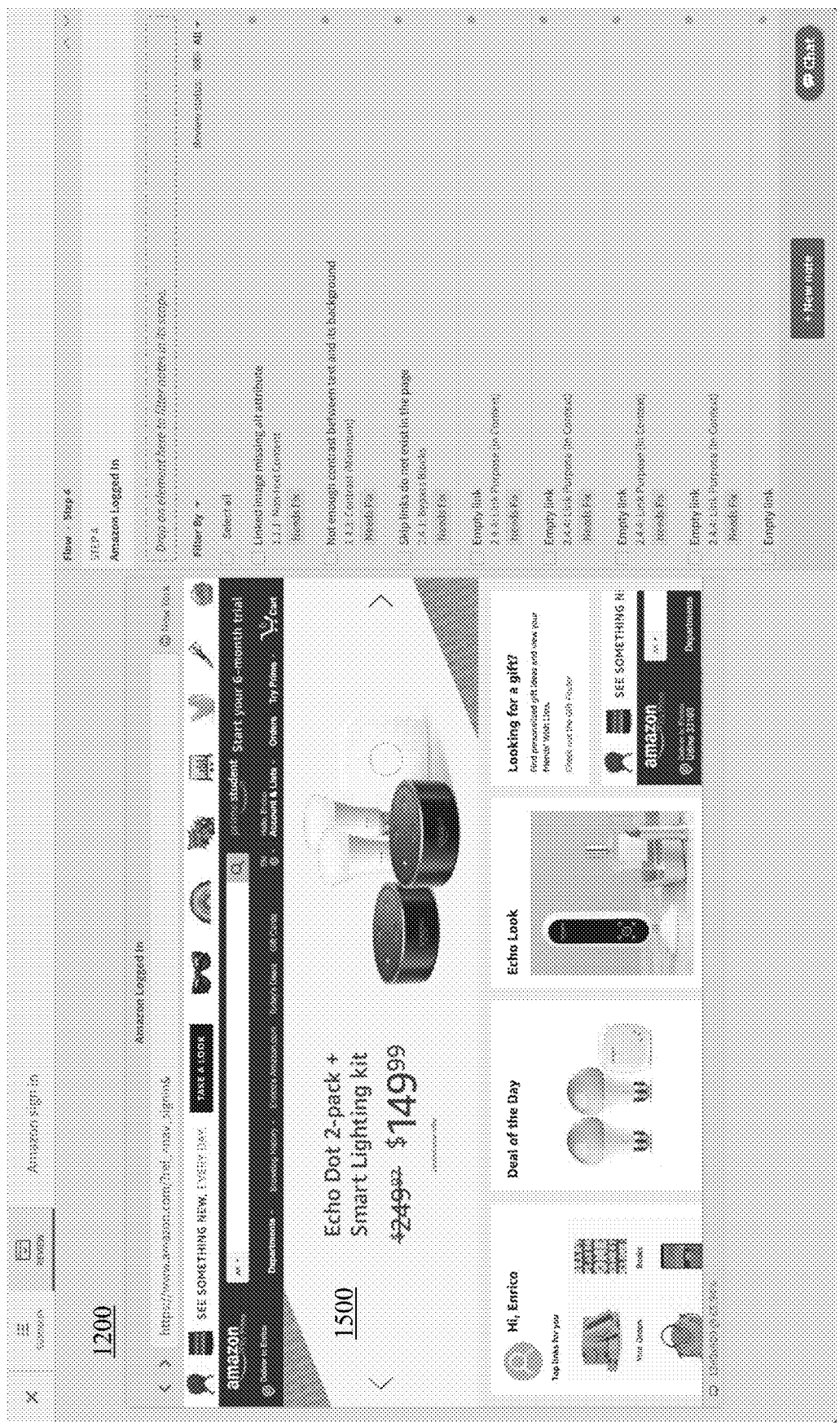

Referring to FIG. 15, a recorded logged-in home page 1500 is presented in the view panel 1200. The recorded logged-in home page 1500 in this particular example follows a successful login using the credentials provided during the test of the web application as described and illustrated earlier with reference to steps 412-414 of FIG. 4 and steps 1112-1116 of FIG. 11.

As described and illustrated by way of the examples herein, this technology facilitates the input of sensitive and other types of data, as well as completion of complex, dynamic, or random input tasks, during a test of a web application or web site that is executed remotely using a headless browser. With this technology, remote headless browsers can execute web application tests asynchronously while ensuring there is an available user to provide required user input data. Based on provided chat facilities, progress messages, and remote execution, for example, this technology facilitates improved, more effective and efficient testing of web applications.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for web application testing, the method implemented by one or more dashboard servers and comprising:
    initiating a test of a web application on a runner server in response to a received command, wherein at least one of a plurality of test actions associated with the test comprises a user input trigger and an associated hint;
    receiving, from the runner server, a user input request generated when the user input trigger is encountered during execution of the test with a headless browser, wherein the user input request comprises a session identifier and the hint;
    obtaining input data from one of a plurality of user devices via at least one input field that is output along with the hint to an input panel provided to the one of the user devices, wherein the input panel is associated with the session identifier; and
    sending the input data to the runner server in response to the received user input request.

2. The method of claim 1, further comprising:
    sending an invitation to the user devices in response to a chat group request received from the runner server; and
    providing the input panel to the one of the user devices in response to an acceptance of the invitation received from the one of the user devices via a chat panel provided to the one of the user devices.

3. The method of claim 1, further comprising:
    receiving a progress request from the runner server, wherein the progress request comprises an indication of another one of the test actions and the session identifier; and
    updating a timeline on the input panel associated with the session identifier to reflect completion of the another one of the test actions in response to the received progress request.

4. The method of claim 1, further comprising receiving, from the runner server, one or more recorded versions of one or more of the web pages and associated analysis resulting from execution of the test, wherein one of the recorded versions of the one of the web pages is sanitized to remove the input data.

5. The method of claim 1, further comprising closing the input panel associated with the session identifier, and outputting an indication of test completion to the one of the user devices, in response to a test completion request comprising the session identifier received from the runner server.

6. The method of claim 1, wherein the hint is defined based on an element of one of a plurality of web pages of the web application.

7. The method of claim 1, wherein the user devices are associated with users identified in test configuration data obtained for the test and the method further comprises generating and sending the session identifier to the runner server in response to the chat group request.

8. A dashboard server, comprising memory comprising programmed instructions stored thereon and one or more processors configured to execute the stored programmed instructions to:
    initiate a test of a web application on a runner server in response to a received command, wherein at least one of a plurality of test actions associated with the test comprises a user input trigger and an associated hint;

receive, from the runner server, a user input request generated when the user input trigger is encountered during execution of the test with a headless browser, wherein the user input request comprises a session identifier and the hint;

obtain input data from one of a plurality of user devices via at least one input field that is output along with the hint to an input panel provided to the one of the user devices, wherein the input panel is associated with the session identifier; and send the input data to the runner server in response to the received user input request.

9. The dashboard server of claim 8, wherein the one or more processors are further configured to execute the stored programmed instructions to:

send an invitation to the user devices in response to a chat group request received from the runner server; and provide the input panel to the one of the user devices in response to an acceptance of the invitation received from the one of the user devices via a chat panel provided to the one of the user devices.

10. The dashboard server of claim 8, wherein the one or more processors are further configured to execute the stored programmed instructions to:

receive a progress request from the runner server, wherein the progress request comprises an indication of another one of the test actions and the session identifier; and update a timeline on the input panel associated with the session identifier to reflect completion of the another one of the test actions in response to the received progress request.

11. The dashboard server of claim 8, wherein the one or more processors are further configured to execute the stored programmed instructions to receive, from the runner server, one or more recorded versions of one or more of the web pages and associated analysis resulting from execution of the test, wherein one of the recorded versions of the one of the web pages is sanitized to remove the input data.

12. The dashboard server of claim 8, wherein the one or more processors are further configured to execute the stored programmed instructions to close the input panel associated with the session identifier, and outputting an indication of test completion to the one of the user devices, in response to a test completion request comprising the session identifier received from the runner server.

13. The dashboard server of claim 8, wherein the hint is defined based on an element of one of a plurality of web pages of the web application.

14. The dashboard server of claim 8, wherein the user devices are associated with users identified in test configuration data obtained for the test and the one or more processors are further configured to be capable of executing the stored programmed instructions to generate and send the session identifier to the runner server in response to the chat group request.

15. A non-transitory computer readable medium having stored thereon instructions for web application testing comprising executable code which when executed by one or more processors, causes the one or more processors to:

initiate a test of a web application on a runner server in response to a received command, wherein at least one of a plurality of test actions associated with the test comprises a user input trigger and an associated hint;

receive, from the runner server, a user input request generated when the user input trigger is encountered during execution of the test with a headless browser, wherein the user input request comprises a session identifier and the hint;

obtain input data from one of a plurality of user devices via at least one input field that is output along with the hint to an input panel provided to the one of the user devices, wherein the input panel is associated with the session identifier; and send the input data to the runner server in response to the received user input request.

16. The non-transitory computer readable medium of claim 15, wherein the executable code when executed by the one or more processors further causes the one or more processors to:

send an invitation to the user devices in response to a chat group request received from the runner server; and provide the input panel to the one of the user devices in response to an acceptance of the invitation received from the one of the user devices via a chat panel provided to the one of the user devices.

17. The non-transitory computer readable medium of claim 15, wherein the executable code when executed by the one or more processors further causes the one or more processors to:

receive a progress request from the runner server, wherein the progress request comprises an indication of another one of the test actions and the session identifier; and update a timeline on the input panel associated with the session identifier to reflect completion of the another one of the test actions in response to the received progress request.

18. The non-transitory computer readable medium of claim 15, wherein the executable code when executed by the one or more processors further causes the one or more processors to receive, from the runner server, one or more recorded versions of one or more of the web pages and associated analysis resulting from execution of the test, wherein one of the recorded versions of the one of the web pages is sanitized to remove the input data.

19. The non-transitory computer readable medium of claim 15, wherein the executable code when executed by the one or more processors further causes the one or more processors to close the input panel associated with the session identifier, and outputting an indication of test completion to the one of the user devices, in response to a test completion request comprising the session identifier received from the runner server.

20. The non-transitory computer readable medium of claim 15, wherein the hint is defined based on an element of one of a plurality of web pages of the web application.

21. The non-transitory computer readable medium of claim 15, wherein the user devices are associated with users identified in test configuration data obtained for the test and the executable code when executed by the one or more processors further causes the one or more processors to generate and send the session identifier to the runner server in response to the chat group request.

* * * * *